Jan. 20, 1953　　　M. P. SEMPLE　　　2,625,893

METHOD OF MAKING PASTRY

Filed Feb. 16, 1952

INVENTOR.
Mildred P. Semple
BY Harold E. Cole
attorney

Patented Jan. 20, 1953

2,625,893

UNITED STATES PATENT OFFICE 2,625,893

METHOD OF MAKING PASTRY

Mildred P. Semple, Quincy, Mass.

Application February 16, 1952, Serial No. 271,912

2 Claims. (Cl. 107—54)

This invention relates to a method of making pastry, such as a pie sheet or crust.

One object of my invention is to provide a new and novel method of making pastry that is especially light, flaky and tasty.

Another object is to provide such a method that is exceedingly simple, does not add to the expense of making pastry nor require special ingredients, and voids the use of a mixing bowl and other commonly used utensils.

The foregoing and other objects which will appear as the nature of the invention is better understood, may be accomplished by a method such as is disclosed by the specification. The nature of the invention is such as to render it susceptible to various changes and modifications, and, therefore, I am not to be limited to said disclosure; but am entitled to all such changes therefrom as fall within the scope of my claims.

In practicing my method I use a flat sheet of material S, preferably square in shape, and measuring about 22" x 22", and place the ingredients on it. For example, I may use one cup of pastry flour, ½ teaspoon of salt, and a little more than ⅓ cup (3 ounces) of shortening, the latter preferably being divided into dabs.

The corners of said sheet and outside edges are gathered in the hand and held to form sort of a container that is airtight, leaving some air space above said ingredients. While holding it in the hand the bag is squeezed gently by the fingers of the other hand until the ingredients are well mixed and in the form of particles about the size of peas. This is shown in said Figure 2. The air within the container formed by the sheet could not escape, hence, at least some of it enters said ingredients.

Figure 3:
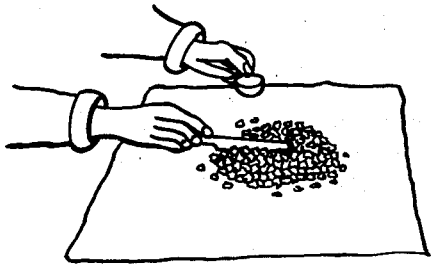
Figure 3 is a perspective view showing the mixture of ingredients having water worked into them while lying on said sheet.

The mixture, in the form of said particles, is then placed upon said sheet and a little liquid, such as water, is slowly added and worked into the particles by a knife or other instrument preferably with a flat side, until the particles increase in size. This is shown in said Figure 3. They become about the size of walnuts. In the example given, two tablespoonfuls of water are added, a few drops at a time, while working the mixture as aforesaid.

Figure 1:
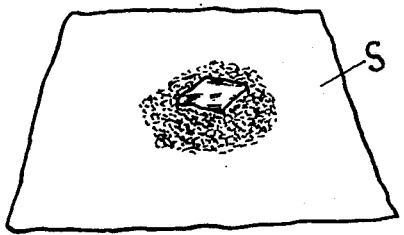
Figure 1 is a perspective view of the ingredients on a sheet ready for mixing.
Figure 2:
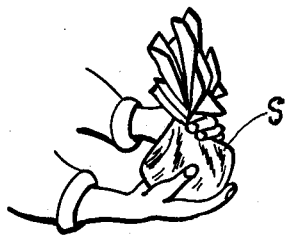
Figure 2 is a perspective view of said sheet held in one hand in the shape of a container while the fingers of the other hand are in position to squeeze said container to thus mix the ingredients.

The particles are again placed on a sheet and a container formed of it, as heretofore explained, and the contents are gently squeezed with the fingers for about ½ minute as shown in said Figure 2. They then are pressed hard until a single ball is formed. Air again has entered the particles, and the ball of material is ready for rolling.

Figure 4:
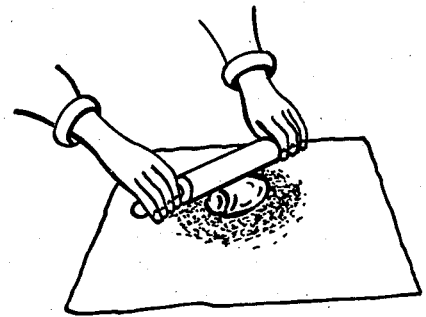
Figure 4 is a perspective view of the ball of material on said sheet ready to be rolled into the desired shape.

While remaining on said sheet S, a small area of the ball is sprinkled lightly with flour and rolled lightly from center of ball towards outside edges, as shown in said Figure 4, whereupon it is ready to be placed in a pan or other baking receptacle.

While I have explained the preferred method of making pastry, good results may be obtained by placing the said ingredients in a container, such as a bag, and using that as explained, instead of said sheet, in which event the ingredients, and the particles, would be placed on a table or the usual baking board instead of laying on said sheet S as explained.

What I claim is:

1. The manipulative method of making pastry dough comprising placing of a plurality of ingredients on a sheet of material, gathering the outer portions of said sheet together to form an enclosure with an air space within it above said ingredients, squeezing said enclosure lightly to thereby mix said ingredients along with air, laying said sheet out flatwise, adding a liquid to and mixing it into the mixture so made, again gathering the outer portions of said sheet to form an enclosure, then squeezing said enclosure lightly, and then pressing it hard enough to cause parts of said mixture to adhere together.

2. The manipulative method of making pastry dough comprising placing of a plurality of ingredients on a sheet of material, gathering the outer portions of said sheet together to form an enclosure with an air space within it above said ingredients, squeezing said enclosure lightly to thereby mix said ingredients along with air, laying said sheet out flatwise, adding a liquid to and mixing it into the mixture so made, again gathering outer portions of said sheet to form an enclosure with an air space within it above said mixture, then squeezing said enclosure lightly, and then pressing it hard enough to form the mixture within it into substantially one piece.

MILDRED P. SEMPLE.

REFERENCES CITED

The following references are of record in the file of this patent:

UNITED STATES PATENTS

| Number | Name | Date |
|---|---|---|
| 1,190,181 | McCurdy | July 4, 1916 |
| 2,107,851 | Boehm | Feb. 8, 1938 |
| 2,576,834 | Hensgen | Nov. 27, 1951 |